US012306924B2

United States Patent
Aasen et al.

(10) Patent No.: US 12,306,924 B2
(45) Date of Patent: May 20, 2025

(54) CONFIGURATION AUTHENTICATION PRIOR TO ENABLING ACTIVATION OF A FPGA HAVING VOLATILE CONFIGURATION-MEMORY

(71) Applicant: Kongsberg Defence & Aerospace AS, Kongsberg (NO)

(72) Inventors: John Aasen, Fjerdingby (NO); Frode Borgersen, Fetsund (NO)

(73) Assignee: Kongsberg Defence & Aerospace AS, Kongsberg (NO)

( * ) Notice: Subject to any disclaimer, the term of this patent is extended or adjusted under 35 U.S.C. 154(b) by 138 days.

(21) Appl. No.: 17/509,608

(22) Filed: Oct. 25, 2021

(65) Prior Publication Data
US 2022/0129537 A1   Apr. 28, 2022

(30) Foreign Application Priority Data
Oct. 26, 2020   (NO) .................................. 20201168

(51) Int. Cl.
*G06F 21/44*   (2013.01)

(52) U.S. Cl.
CPC .................................. *G06F 21/44* (2013.01)

(58) Field of Classification Search
CPC ...... G06F 21/44; G06F 11/1004; G06F 21/57; G06F 21/76; H03K 19/17764
See application file for complete search history.

(56) References Cited

U.S. PATENT DOCUMENTS 4,866,713 A * 9/1989 Worger .................. G06F 11/10
 714/25
6,282,631 B1 * 8/2001 Arbel .................... G06F 9/3013
 712/E9.067

(Continued)

FOREIGN PATENT DOCUMENTS

| CN | 211653636 U | 10/2020 |
| EP | 3667529 A1 | 6/2020 |
| WO | 2020/120079 A1 | 6/2020 |

OTHER PUBLICATIONS

Norwegian Search Report issued in No. 20201168 mailed on May 10, 2021 (3 pages).

(Continued)

*Primary Examiner* — Faisal M Zaman
(74) *Attorney, Agent, or Firm* — Osha Bergman Watanabe & Burton LLP

(57) ABSTRACT

A method and system for authenticating and enabling activation of a configuration used for controlling a product, where the configuration is implemented as safety critical logic functions in programmable logic blocks of a Field Programmable Gate Array, FPGA, having a volatile configuration-memory. The configuration is loaded into the volatile configuration-memory of the FPGA via an external interface input of the FPGA. The content of the configuration-memory of the FPGA is read via an interface of the FPGA. This is done immediately after completed loading of the configuration into the memory of the FPGA. A Cyclic Redundancy Check, CRC, checksum of the read content of the configuration-memory is computed in an CRC checksum generator, and a resulting generated CRC checksum value is compared with an externally stored valid CRC checksum value of the expected FPGA configuration. It is then checked if the generated CRC checksum value and the stored valid CRC checksum value match and the outputs of selected (Continued)

logic functions of the FPGA are enabled only if the generated CRC check value and the stored valid CRC checksum values match.

14 Claims, 4 Drawing Sheets

(56) References Cited

U.S. PATENT DOCUMENTS

| | | | | |
|---|---|---|---|---|
| 7,036,059 | B1* | 4/2006 | Carmichael | G06F 11/106 |
| | | | | 714/725 |
| 7,257,750 | B1* | 8/2007 | Singh | G11C 29/42 |
| | | | | 714/732 |
| 7,278,128 | B1 | 10/2007 | Trimberger | |
| 7,363,573 | B1* | 4/2008 | Bataineh | H03M 13/09 |
| | | | | 714/758 |
| 7,596,744 | B1* | 9/2009 | Kow | G06F 11/1004 |
| | | | | 714/819 |
| 7,607,025 | B1* | 10/2009 | Trimberger | G06F 21/76 |
| | | | | 713/193 |
| 7,620,853 | B1* | 11/2009 | Kasnavi | G11C 29/02 |
| | | | | 714/719 |
| 8,065,574 | B1* | 11/2011 | Cheng | G01R 31/31816 |
| | | | | 714/736 |
| 8,340,134 | B1* | 12/2012 | Gorshe | H04J 3/1658 |
| | | | | 370/506 |
| 2003/0028781 | A1* | 2/2003 | Strongin | G06F 9/24 |
| | | | | 712/E9.007 |
| 2003/0097628 | A1* | 5/2003 | Ngo | H03K 19/17764 |
| | | | | 714/736 |
| 2004/0039872 | A1* | 2/2004 | Takamizawa | G06F 8/65 |
| | | | | 713/2 |
| 2005/0071730 | A1* | 3/2005 | Moyer | H03K 19/17764 |
| | | | | 714/758 |
| 2005/0174370 | A1* | 8/2005 | Sarmast | B41J 2/17546 |
| | | | | 347/7 |
| 2005/0213693 | A1* | 9/2005 | Page | H04L 9/40 |
| | | | | 375/354 |
| 2006/0020774 | A1* | 1/2006 | Ramos | G06F 13/4217 |
| | | | | 712/226 |
| 2006/0115923 | A1* | 6/2006 | Richards | B82Y 30/00 |
| | | | | 348/E5.142 |
| 2007/0260869 | A1* | 11/2007 | Dade | G06F 9/4401 |
| | | | | 713/2 |
| 2011/0209021 | A1* | 8/2011 | Sorensen | A61B 7/04 |
| | | | | 714/E11.155 |
| 2012/0011423 | A1* | 1/2012 | Entezari | G06F 11/1004 |
| | | | | 714/E11.032 |
| 2013/0138993 | A1* | 5/2013 | Franklin | G11C 5/147 |
| | | | | 714/2 |
| 2015/0242615 | A1 | 8/2015 | Newell et al. | |
| 2015/0303926 | A1* | 10/2015 | Tahiri | H03K 19/17756 |
| | | | | 326/40 |
| 2017/0212797 | A1* | 7/2017 | Tsuda | G06F 11/1004 |
| 2018/0224842 | A1* | 8/2018 | Ichimura | G05B 19/058 |
| 2020/0379831 | A1* | 12/2020 | Shimbo | G06F 11/142 |
| 2021/0314088 | A1* | 10/2021 | Jain | H03M 13/091 |

OTHER PUBLICATIONS

Implementing JOTP-051-Compliant Safety Features in Lattice FPGAs, Technical Note FPGA-TN-02150-1.0, Lattice Semiconductor, Sep. 2020 (15 pages).

Joint Ordnance Test Procedure (JTOP), JOTP-051, Technical Manual for the Use of Logic Devices in Safety Features, Department of Defense, DoD Fuze Engineering Standardization Working Group (FESWG), Feb. 10, 2012 (9 pages).

The Development of a FPGA Based Front End Safety Interlock System, Part of Proceedings, 12th International Workshop on Personal Computers and Particle Accelerator Controls (PCaPAC 2018) : Hsinchu, Taiwan, Oct. 16-19, 2018 (3 pages).

Extended European Search Report issued in Application No. 21204239.4 mailed on Mar. 7, 2022 (9 pages).

* cited by examiner

CONFIGURATION AUTHENTICATION PRIOR TO ENABLING ACTIVATION OF A FPGA HAVING VOLATILE CONFIGURATION-MEMORY

FIELD OF THE INVENTION

The present invention relates to authentication of a configuration implemented as logic functions in programmable logic blocks of a Field Programmable Gate Array (FPGA) having a volatile configuration-memory, where authentication enables activation of selected logic functions of the configuration.

BACKGROUND

Products such as systems and devices made for performing different kinds of actions are typically operated and controlled by controllers comprising logic describing how they shall operate. The logic can be implemented in hardware adapted for controlling a specific device or system. If a device is to operate as expected it is vital that the controlling logic is valid.

If a product is controlled by logic that is not valid, the product may not operate as expected. For safety significant products this may result in accidents, damage to or loss of equipment or property, or a fatal incident.

Safety significant products are required to go through extensive and often expensive testing before being launched to demonstrate a reliable and safe solution. The development of the safety logic often needs to follow a rigorous development process. Test reports of a product, code development artefacts and other documents are usually provided by a third party for safety evaluation to get a safety approval of the product. This safety approval is normally valid for one specific configuration of the product. If any changes are introduced, the safety approval might not be valid anymore. When a product has been safety approved, it is essential that the same configuration is used in the product and that no changes are introduced.

Examples of some safety significant products are cars, planes, and missiles. The term safety significant is normally used to describe functions, objects and products having impact on safety. The term includes safety related and safety critical objects and products. In the following, the term safety critical is generally used to describe both safety significant functions, systems, and products.

Controlling logic for a product can be implemented in a microcontroller or in programmable logic. When using a microcontroller to implement safety critical logic, the US standard JOTP-051 technical manual suggests performing an external Cyclic Redundancy Check, CRC, of the program stored in an external Flash to ensure that the qualified program is used.

Depending on the logic being implemented, programmable logic might be a better choice than a microcontroller. Programmable logic devices have better deterministic timing and are intrinsically massively parallel compared to a microcontroller. This can allow multiple safety features or parts of these to be implemented in one programmable logic device with less interdependence than when implemented in microcontrollers. Programmable logic devices also provide the possibility to support custom interfaces that are not supported by microcontrollers.

Examples of programmable logic are Programmable Array Logic (PAL), Complex Programmable Logic Device (CPLD) or Field Programmable Gate Array (FPGA) having the most complex architecture of these.

FIG. 1 illustrates a typical prior art FPGA set-up where the configuration logic in the FPGA receives and checks a configuration from an external source before loading it into the volatile configuration-memory of the FPGA.

A FPGA is a semiconductor logic chip comprising thousands of logic gates which can be programmed by a configuration bitstream to become almost any kind of system or digital circuit. Configuration of the FPGA architecture is generally specified using a programming language, i.e., HDL (Hardware Description language). The HDL code is translated by software that maps the behaviour described in the HDL code to the available building blocks of the FPGA. The result is a configuration bit-stream that is downloaded to the FPGA.

When safety logic is implemented in programmable logic, such as a FPGA or CPLD, it is important to ensure that a single approved configuration is used in the final product. Possible changes in the configuration might be deliberately introduced by updating the programmable logic. This will typically require a re-approval before the new logic may be used. It is also possible for a stored configuration to be corrupted, especially when the configuration is stored in non-volatile memory. In principle, corrupting the configuration changes the behaviour of the programmable logic in unpredictable ways. For FPGAs, a checksum of the configuration is usually incorporated in a configuration bit-stream to ensure that a corrupt configuration is not used.

A generic FPGA comprises several different building blocks such as the following:

Soft Logic—Gates, Look-up-tables, Flip-Flops, and multiplexers (MUX), i.e. the logic resources that implement the user function defined by the HDL code.

Hard Logic—dedicated and more complex functions providing either housekeeping functionality or fixed user logic. Examples of hard logic include: Configuration logic, JTAG logic, Memory, PCI express, Ethernet MAC, High-speed transceivers, Clock Management.

Routing resources—configurable routing resources that allows the Soft Logic and Hard Logic to be connected to implement a user function. The routing includes both dedicated high-speed and balanced routing for global signals such as clocks and resets, and 'normal' routing for 'normal' signals.

Configuration—any FPGA needs to have a way to store the configuration of the soft logic and the routing. The two technologies discussed here are Antifuse and SRAM.

Antifuse—The FPGA device is configured once by burning non-volatile antifuse connections in dedicated layers in the device. This creates connections between the various logic resources in the device and thus programs the device. This configuration is non-volatile and cannot be changed once the device is programmed.

SRAM—The FPGA needs an external non-volatile configuration memory with the FPGA configuration while the system is powered down. The FPGA is configured when power is supplied by reading from the non-volatile memory and writing to a dedicated SRAM based configuration memory in the FPGA. After the FPGA is configured it will be able to do the function it was given by the design.

The contents of the memory controls both the routing resources, the soft logic and potentially parts of the hard logic. This both creates connections between the various logic resources and configures the logic resources, thus configuring the device to implement the user logic. This configuration is volatile and needs to be loaded into the FPGA each time the FPGA is powered.

A FPGA can be configured to implement clocked synchronous logic. The number of clocks used depends on the user logic being implemented, and can vary from 1 to n, where n normally is a fairly low number. In one example 5 clocks are used. These clocks are routed using dedicated high-speed clock networks provided by the FPGA. The Clock Management hard logic provides the possibility to generate internal clocks that are derived from an external clock. The clocks present and available in the FPGA can be divided into Global clocks and Regional clocks.

For Global clocks, clock signals are routed over the entire FPGA as shown in the left part of FIG. 2. For Regional clocks, clock signals are routed over one or more regions of the FPGA, but not over the entire FPGA, as shown in the right part of FIG. 2.

A FPGA typically has a built-in configuration authentication mechanism consisting of a type of checksum check, typically generated by a Cyclic Redundancy Check (CRC) to detect that the configuration is as expected and has not been corrupted. Some devices also verify that the configuration is for the actual device being configured. In addition, some devices also support use of optional encrypted configuration to avoid that the configuration is stolen and used in other designs.

There are however no solutions authenticating that one single, specific configuration is used for a specific product. This is required for some applications. One example is where a specific FPGA design has been approved. This approval may be done by a third party. In these cases, it may not be sufficient to know that a valid configuration for the FPGA is used. It may also be vital that the approved configuration is used for a specific product or system. It is only the specific approved configuration that shall allow the system to perform the intended functionality.

The state-of-the art when using programmable logic of FPGAs in safety critical systems is to use antifuse based FPGAs. These have a non-volatile, one-time programmable configuration which cannot be changed after the product has been produced. The configuration is also very robust, so that corruption of the configuration is very unlikely.

The problem with using antifuse based FPGAs is that it is an old technology with a single vendor. The last antifuse FPGA family was released in 2003. The availability of the devices is declining, and the vendor has stated that it is expected that the antifuse devices will be absent within in a few years.

Compared to newer FPGAs with volatile memory such as Static Random-Access Memory (SRAM), the largest antifuse devices are small and may not have sufficient speed, capacity or features to implement the required functionality for many applications.

Today's state-of-the art programmable devices are SRAM based FPGAs and System on Chip (SoCs) from Xilinx and Intel. These devices use configuration interfaces to transfer the configuration bit-streams from an external non-volatile memory to the volatile SRAM memory inside the devices. This volatile memory controls the routing and function of the FPGAs. The configuration is often stored in an external Flash device.

The two main problems when using these devices in safety critical systems is that the devices do not have a method to ensure that a specific configuration is used and further that it is possible for the contents of the Flash to be corrupted. In both cases an unknown change in the behaviour of the safety critical system may be introduced.

FPGAs typically have a CRC checksum of a loaded configuration bitstream. If a CRC failure is detected, the configuration is aborted. This feature detects corruption of a non-volatile image but cannot ensure that a specific configuration is used.

State-of-the art devices have added the possibility to authenticate the bitstream using a secret non-volatile key programmed into the device. A Message Authentication Code is embedded into the bitstream and the configuration logic in the FPGA verifies the authenticity of the bitstream. This feature detects both if a malicious attacker attempts to change the configuration and corruption in the non-volatile image but cannot ensure that a specific configuration is used for a specific device.

There also exists some Flash based FPGAs where the configuration is stored in internal Flash, i.e. on the same device as the programmable logic. Microsemi, the main antifuse FPGA vendor, has released several Flash based FPGA families since the last antifuse FPGA was released.

These devices do not provide any interface to read the configuration memory or Flash contents. This makes it impossible to verify that the correct configuration is used and that the Flash has not been corrupted. The devices are thus not suitable for ensuring that a single, qualified configuration is used for a specific device.

As mentioned, state-of-the art programmable devices are SRAM based FPGAs. An SRAM based FPGA needs to be configured by loading a configuration after power-up. This process is controlled by hard-wired logic, designed by the FPGA vendor. There are several different interfaces that a FPGA supports. In either case the bitstream with the configuration is loaded into and parsed by the configuration logic and then written to the volatile configuration in the FPGA.

The configuration FSM can also support multiple configuration bitstreams in a non-volatile memory device. If the first configuration fails, the second bitstream is used. This provides fall-back configurations that can recover if an upgrade of the FPGA fails. Use of this feature is not typical in a safety significant application, but it should be considered when evaluating the method used to check a configuration.

As understood from the above, an antifuse FPGA is the most reliable solution for assuring that a valid configuration code for controlling a specific device is written to the FPGA. Since such devices have been discontinued, the applicant and other research communities have worked several years trying to find a reliable technology that can replace antifuse FPGA devices to implement safety critical logic.

The present invention allows currently available FPGAs with volatile memory such as SRAM to be used to implement safety critical functions as well as other functions while still ensuring that a single, approved configuration loaded into the memory is used to control a specific device.

If the configuration is changed, either due to attempting to use an updated configuration or by malfunction or corruption of the non-volatile memory, the outputs for logic functions from the FPGA will not be available for controlling a specific device.

SHORT DESCRIPTION OF THE INVENTION

The present invention comprises a method for authenticating and enabling a configuration implemented as logic functions in programmable logic in a Field Programmable Gate Array, FPGA, having a volatile configuration-memory, where authentication enables activation of selected logic functions of the configuration.

The method comprises the following steps:

loading, from a memory module connected to the FPGA, the configuration into the volatile configuration-memory of the FPGA via an external input interface of the FPGA, reading the content of the volatile configuration-memory of the FPGA via an interface of the FPGA immediately after completed loading of the configuration, computing one or more different Cyclic Redundancy Check, CRCs, of the read content of the configuration-memory in one or more CRC generators, comparing computed CRC checksum values in a comparator module connected to an output of the FPGA with externally stored valid CRC checksum values of an expected FPGA configuration, enabling outputs from the FPGA of the selected logic functions of the configuration, via an interlock device connected to the outputs of the FPGA and an output of the comparator module, only if the compared generated CRC checksum values and the stored valid CRC checksum values are identical.

According to one embodiment of the method, disabling of the logic functionality of the FPGA is performed at the latest immediately after completed loading of the configuration into the memory of the FPGA.

According to an embodiment of the method, disabling of the logic functionality of the FPGA is performed by setting CRC checksum values that are initially output from the CRC generators to other values than the stored valid CRC checksum values.

According to one embodiment of the method, disabling of selected logic functions of the FPGA is performed by stopping the internal clocks for all logic functionality in the FPGA.

According to an embodiment of the method, computing of the one or more CRC checksums is performed in one or more internal CRC generators of the FPGA and the resulting generated CRC checksum values is output, via external outputs of the FPGA, to external discrete logic comparing the generated CRC checksum values with the externally stored valid CRC checksum values generated from the expected and valid configuration.

According to an embodiment of the method, computing of the one or more CRC checksums is performed in one or more CRC generators that are external to the FPGA after outputting the readout from the configuration memory to the one or more external CRC generators, via external outputs of the FPGA, and comparing the resulting generated CRC checksum values in external discrete logic with the externally stored valid CRC checksum values generated from the expected and valid configuration.

According to one embodiment of the method, a configuration for computing the one or more different Cyclic Redundancy Checksums in the one or more CRC generators of the FPGA is included as a part of the configuration loaded into the configuration-memory of the FPGA.

According to one embodiment of the method, the valid CRC checksum values is stored in a non-programmable circuit.

According to one embodiment of the method, the generated CRC checksum values is compared in external non-programmable circuits.

According to an embodiment of the method, the logic functions in programmable logic in the Field Programmable Gate Array, FPGA, are safety significant functions.

The invention is further defined by a system for authenticating and enabling activation of a configuration implemented as logic functions in a Field Programmable Gate Array, FPGA, with a volatile configuration-memory. Authentication enables activation of selected logic functions of the configuration for controlling an device. The system further comprises:

a memory module connected to an input of the FPGA, where the memory module comprises the configuration to be used by the FPGA, a comparator module connected to an output of the FPGA for comparing a valid Cyclic Redundancy Check, CRC, checksum value, with a received CRC checksum value generated by a CRC checksum value generator from a content of the configuration-memory of the FPGA that is read immediately after completed loading the configuration into the memory of the FPGA, an interlock device connected to outputs of the FPGA carrying the selected logic signals for controlling a function and which further has an input connected to the comparator module, the interlock device is adapted for enabling or disabling the logic signals on the outputs of the FPGA based on an enable/disable signal from the comparator module.

According to one embodiment of the system, the valid CRC checksum is encoded in pull-up and pull-down resistor values stored on separate discrete logic.

According to another embodiment of the system, the valid CRC checksum is encoded in Dual in-line Packages, DIP, switches.

According to one embodiment of the system, the comparator module comprises logic for comparing generated CRC checksum with a valid CRC checksum.

According to one embodiment of the system, the interlock device comprises logic gates and outputs configured to pass signals from the outputs of the FPGA only when receiving a valid CRC checksum on the input connected to the comparator.

SHORT DESCRIPTION OF THE DRAWINGS

The present invention will be described in detail with reference to the following figures showing examples of embodiments:

DETAILED DESCRIPTION OF THE INVENTION

The purpose of the present invention is to allow a Field Programmable Gate Array, FPGA, with a volatile configuration memory to be used to implement logic functions while still ensuring that a single, qualified and valid configuration loaded into the memory is used to control a specific device.

As mentioned in the background section above, a known method to check the validity of a FPGA configuration is to compute a checksum of a loaded bitstream in the memory. This is however not ideal for a FPGA since the check does not cover the configuration interface and configuration logic described in the background section above. Any errors occurring in these steps will not be detected. In addition, if a fall-back bitstream image has been used, a check of the non-volatile memory might check the bitstream that is not used.

Figure 1:
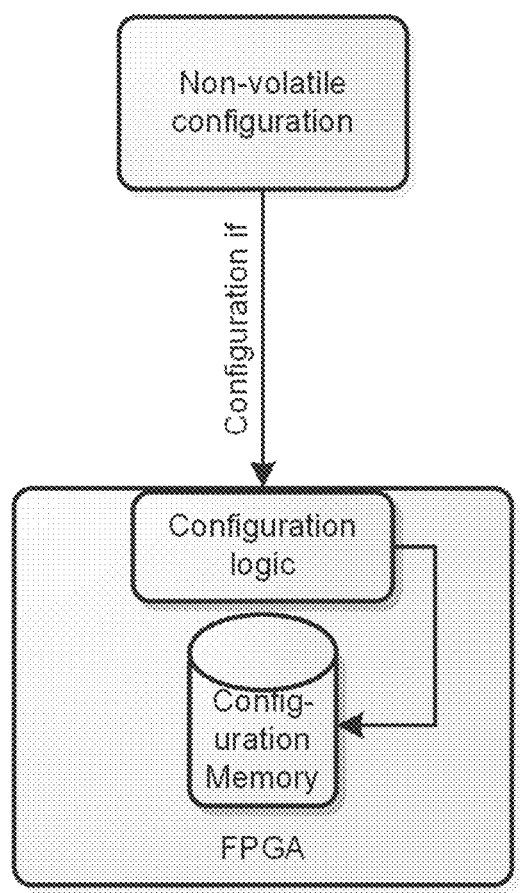
FIG. 1 illustrates a typical FPGA configuration.

FIG. 1 illustrates a typical prior art FPGA configuration where configuration logic in the FPGA receives and checks a configuration from an external source and loads it into a volatile configuration-memory, e.g. SRAM, of the FPGA.

According to the present invention a check of the actual configuration memory being used by the FPGA is added. This is enabled by reading out the actual, running configuration memory in the FPGA immediately after the configuration has been loaded into the FPGA. This is done by using either soft logic, i.e. programmable logic, in the FPGA, dedicated hard logic in the FPGA, or a mix of these. While the configuration memory is being read, a Cyclic Redundancy Check (CRC) checksum is computed over the contents of the entire configuration memory.

Computing the CRC checksum from the actual configuration memory in the FPGA is better than computing the CRC on the data being transferred on the configuration interface since the CRC checksum then also covers any changes due to any errors in the configuration interface or discrepancies introduced by the hard FPGA logic that controls the configuration.

After powering up a volatile FPGA, it receives a configuration that is loaded into its volatile configuration memory. The configuration is typically a bit stream read from an external non-volatile memory, where the bit stream is entering the configuration-memory of the FPGA via the configuration logic. The configuration logic parses the bitstream and writes the configuration to the volatile configuration-memory of the FPGA. This is illustrated in FIG. 1.

Figure 3:
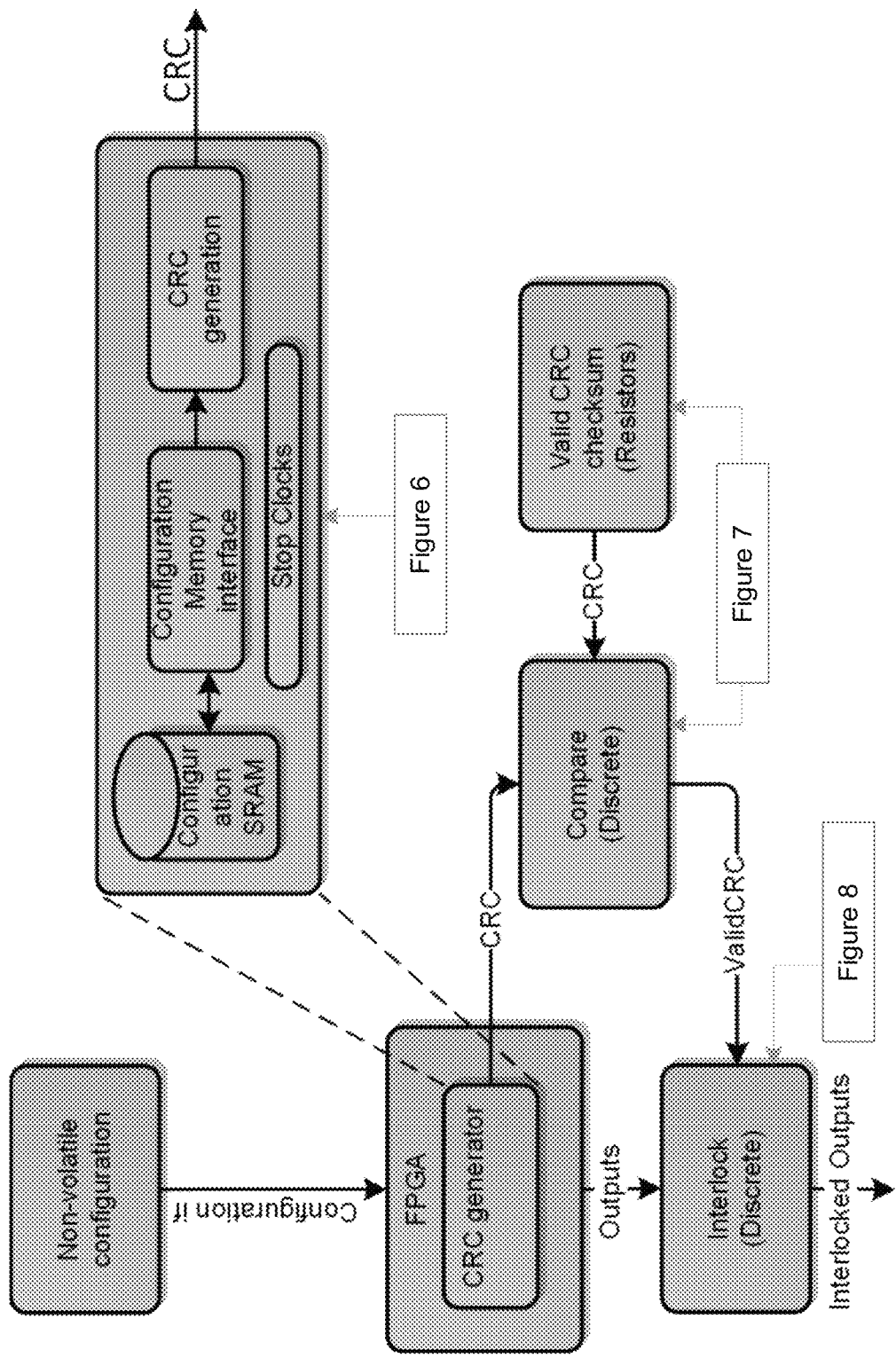
FIG. 3 illustrates dataflow between different modules of the invention.

FIG. 3 shows an overview of the different modules and dataflows between these modules according to the invention. The figure illustrates an SRAM based FPGA used for implementing safety critical functions.

The invention comprises a system for authenticating and enabling activation of a configuration implemented as logic functions in a Field Programmable Gate Array, FPGA, such as the one described above with reference to FIG. 1. The FPGA comprises a volatile configuration-memory where authentication enables activation of selected logic functions of the configuration for controlling a device.

The system further comprises a memory module connected to an input of the FPGA, and the memory module comprises a configuration to be used by the FPGA. The configuration may be implemented in a non-volatile configuration as indicated in FIG. 3.

A comparator module, indicated as Compare (Discrete), is connected to outputs of the FPGA for comparing a valid CRC checksum value with a received CRC checksum value generated by an internal CRC generator of the FPGA from a content of the configuration-memory of the FPGA that is read immediately after completed loading of the configuration into the memory of the FPGA. The CRC checksum can also, in another embodiment, be generated by an external CRC generator.

The valid CRC checksum is on one embodiment encoded by means of pull-up and pull-down resistors values stored on separate discrete logic. In another embodiment, a valid CRC checksum is encoded by means of Dual in-line Packages, DIP, switches.

The system further comprises an interlock device connected to outputs of the FPGA carrying the selected logic signals for controlling the device and where the interlock device further has an input connected to the comparator module.

The interaction of the interlock device and comparator module enables or disables the logic output signals of the FPGA based on an interlock signal from the comparator module. The interlock device is adapted to pass signals from its input to its output only when the interlock control signals the comparator module is set and activated.

If the interlock control signal from the comparator is set to enabled (high), the interlock device will pass signals from the connected FPGA to its outputs, and if the interlock control signal from the comparator is set to disabled (low), the interlock device will block signals from the connected FPGA.

In one embodiment, the comparator module comprises logic for comparing generated CRC checksum with a valid CRC checksum. In one embodiment, the interlock device comprises logic gates and outputs configured to pass selected logic signals from the outputs of the FPGA only when the interlock control signal from the comparator is enabled (high).

The invention further provides a method for authenticating and enabling a configuration for controlling a device, e.g. such as a device controlling a safety critical product. The configuration is implemented as logic functions in programmable logic blocks of a FPGA having a volatile configuration-memory. Enabling activation of a configuration means that the outputs from the FPGA providing logic controlling signals are passed through the interlock module thereby made available for controlling a specific device.

The invention further provides mechanisms to ensure that the outputs of selected logic functions are driven to a safe value by the interlock module before the generated CRC checksum has been computed. This can be done according to different methods.

According to one method, the generated CRC checksum signals are driven to another value than the valid CRC checksum using pull-up and/or pull-down resistors. This ensures that the comparator module does not confirm a valid CRC checksum before the FPGA is powered and before the configuration process has completed.

According to another method, the generated CRC checksum signal in the FPGA is reset to another value than the valid CRC checksum. This ensures that the comparator module does not confirm a valid CRC checksum until the FPGA has been configured and a valid CRC checksum has been computed from the read content of the configured FPGA.

The first step of the method is loading the configuration into the volatile configuration-memory of the FPGA via an external interface input of the FPGA.

The configuration is a bit stream entering the configuration-memory of the FPGA via the configuration logic after powering the FPGA up, and where the configuration logic parses the bitstream and writes the configuration to the volatile configuration-memory of the FPGA.

After this, the next step is reading the content of the configuration-memory of the FPGA via an interface of the FPGA after completed loading of the configuration memory.

In one embodiment, this is done via an internally available interface of the FPGA to the actual configuration memory in the FPGA. This interface must be accessible for use by the internal logic. The internal interface is typically used for partial reconfiguration of the device and for detection and handling of Single Event Upsets in the configuration memory. Xilinx is an example of a vendor providing a FPGA with an internal interface to the configuration memory.

In one embodiment, the logic functionality of the FPGA is disabled at latest immediately after completed loading of the configuration into the memory of the FPGA.

According to one embodiment of the invention, an internally available interface is used to read the content of the configuration memory of the FPGA before computing a checksum that covers the contents of the configuration memory.

Vendors of FPGAs define a sequence the programmable logic needs to follow to read the configuration memory. This is typically defined in a FPGA configuration user guide for the relevant FPGA family of devices.

The logic functionality of the FPGA is disabled once configuration has been loaded into the configuration memory of the FPGA. This is done since some FPGA families overwrite parts of the configuration memory during operation of the FPGA. To ensure that these configuration memory locations are not changed before the CRC checksum of the loaded configuration has been computed, the functionality of the FPGA is disabled.

In one embodiment of the invention, selected logic functionality of the FPGA is disabled by stopping the internal clocks for this logic functionality in the FPGA while keeping the clock(s) used by the logic reading out the configuration memory running.

The vendor Xilinx provides FPGAs with internal clock buffers with enable pins for enabling and disabling the clock signals. These clock buffers are designed such that the disabling and enabling of the clocks are safe without producing spurious glitches or too short pulses on the clock lines in the FPGA.

The vendor Xilinx provides FPGAs with Look Up Tables (LUT), Single bit memory elements (Flip-flops) and Larger memory blocks implemented in dedicated memory (BlockRAM). These are the building blocks for creating the soft logic.

The LUTs are n-bit read-only memories (ROM) that can implement any n-bit logical function. N is 4 or 6 depending on the FPGA family. The ROM contents is part of the configuration memory.

The LUT can also be configured to be used as a Random-Access Memory (LUT RAM) or shift-register (SRL). When the LUT is used as LUT RAM or SRL, the user logic will write to the memory in the LUT. Since this is the same memory as the ROM contents, this is also the configuration memory. When the user logic writes to the LUT RAM or the SRL, the configuration memory will be updated.

The hard logic memories, called BlockRAM by Xilinx, also uses the configuration memory. This means that when the BlockRAM is written to, the configuration memory will be updated. Also note that the Xilinx documentation states the BlockRAM is not accessible from the user logic when a configuration memory readback is taking place. User logic that depends on accessing a BlockRAM will thus fail if it attempts to run when the configuration memory readback check is running.

Both these issues require that the design is such that any writes to LUT RAM, SRL or BlockRAM is deferred until the configuration memory readback has completed. It is however not desirable to change all this logic and add the knowledge about the CRC checksum in all the logic.

According to one embodiment of the invention, a better method is proposed. That is to stop the clocks used by all the soft logic in the FPGA, except the clocks for the configuration memory readback and CRC checksum computing logic. To do this, this function is allocated to a separate module that we have called the StopClocks module. The StopClocks module uses BUFGCE (global clock buffer with single gated inputs) on global clocks and BUFR on regional clocks. These building blocks have a CE (ClockEnable) pin and logic to ensure that glitches are not generated when the clocks are enabled or disabled. The clocks to the remainder of the FPGA are disabled until the CRC checksum has been computed, ensuring that a consistent checksum can be computed.

In this way we have ensured that the configuration readout and CRC checksum generation functions have a clock to be used by the soft and hard logic that reads out the configuration memory and computes the CRC checksum.

Figure 2:
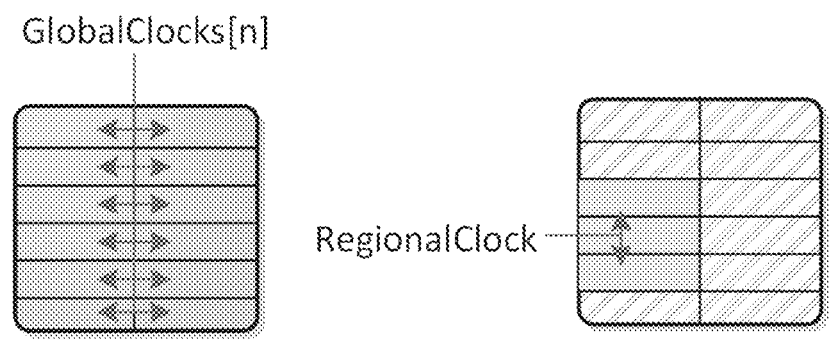
FIG. 2 illustrates different FPGA regions and corresponding clocks.

FIG. 2 illustrates an example of different regions and corresponding clocks comprised in a FPGA. For Global clocks, clock signals are routed over the entire FPGA as shown in the left part of figure. For Regional clocks, clock signals are routed over one or more regions of the FPGA, but not over the entire FPGA, as shown in the right part of figure.

Figure 4:
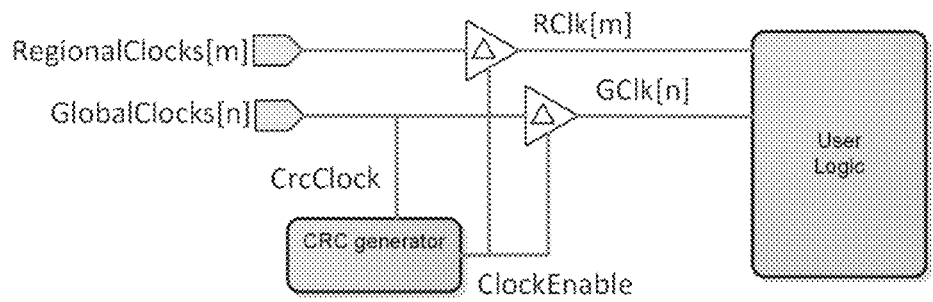
FIG. 4 illustrates a generic clock architecture.

FIG. 4 shows an example of a clock architecture, where the user logic uses n (one or more) global clocks and m (zero or more) regional clocks.

One of the global clocks is selected for use by the configuration readout. For this use it is called 'CrcClock'.

Stopping the clocks to the User Logic is done by using dedicated clock buffers with enable pins. As mentioned, these clock buffers are designed such that the disabling and enabling of the clocks is safe without producing spurious glitches or too short pulses on the clock lines in the FPGA.

In FIG. 4 the clock buffers are indicated by the triangular shaped buffers. The ClockEnable signal from the CRC checksum generator module controls the clock buffers. The ClockEnable signal is deasserted, i.e. set to its inactive state, at power up and stays deasserted until the CRC checksum generator has completed the readback procedure.

Figure 5:
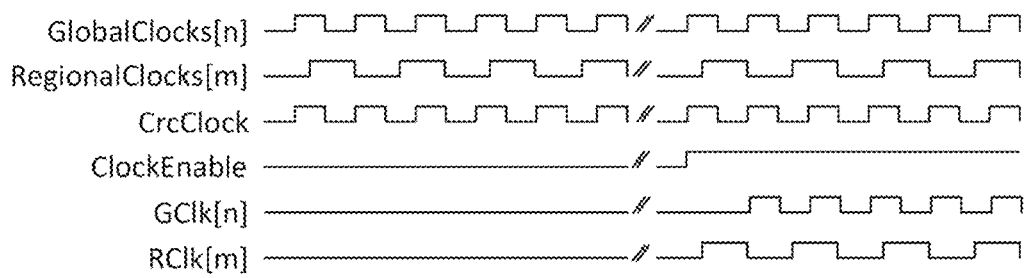
FIG. 5 shows a clock timing diagram.

FIG. 5 shows a clock timing diagram. The assumption is that all global and regional clock inputs to the FPGA are running when the FPGA has completed its configuration process. The CrcClock is also running after configuration, providing a clock signal to the CRC checksum generator logic.

After the CRC checksum generator logic has completed its task, the ClockEnable signal is asserted, i.e. set to its active state. The Clock buffers then enable the clocks to the user logic at a safe position in time, without generating any glitches or short timing pulses. This is indicated in the FIG. 5 where GClk is delayed about one clock cycle compared to ClockEnable.

As mentioned above, the clocks are stopped for all logic in the FPGA other than the clocks of logic enabling reading out the configuration from the memory. The clocks are stopped until a CRC checksum has been computed, which is done in the next step of the method described below. By setting clock buffers with enable/disable pins to be disabled, the clocks will stop and writing to the internal volatile configuration-memory is not possible.

If the design of a FPGA uses SRL or LUT RAM, the actual configuration bits are updated by the design. When doing a readback of a Block RAM, the user logic cannot access the memory. StopClocks module instantiates BUFGCE on global clocks and BUFR on regional clocks. These have a ClockEnable (CE) pin and logic to ensure that glitches are not generated when the clocks are enabled or disabled. The clocks to the remainder of the FPGA are disabled until the CRC checksum has been computed, ensuring that a consistent checksum can be computed.

The next step of the method is computing a Cyclic Redundancy Check, CRC, checksum of the read content of the configuration-memory in an internal CRC checksum generator of the FPGA.

Figure 6:
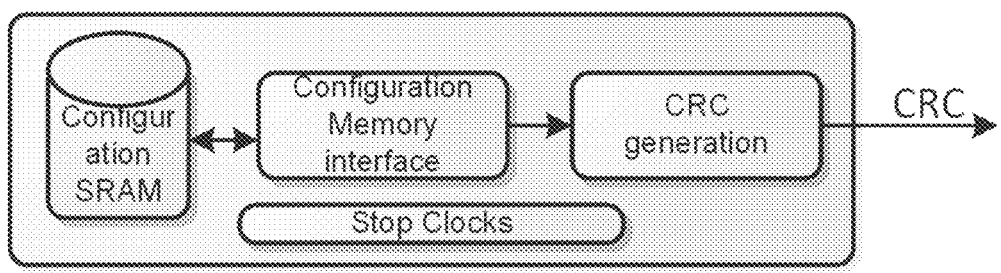
FIG. 6 shows details of the CRC checksum generator in the FPGA.

FIG. 6 illustrates the different units involved when computing a CRC checksum value. After the clocks enabling further writing to the configuration memory has been stopped, a configuration memory interface reads the configuration from SRAM and passes the configuration to a CRC checksum generator for generating a CRC checksum value.

In one embodiment of the invention, the configuration defining how the CRC checksum is to be computed in the CRC checksum generator of the FPGA is included as a part of the configuration implementing the safety critical logic functions that is loaded into the configuration-memory of the FPGA. In another embodiment, the configuration defining how the CRC checksum is to be computed in the CRC checksum generator is hard coded external to the FPGA.

The next step of the method is outputting a resulting generated CRC checksum value, via an external output of the FPGA. This is received by external discrete logic comparing the generated CRC checksum value with an externally stored valid CRC checksum value. The valid CRC checksum value is the expected CRC checksum value generated from the configuration that is loaded into the logic blocks of the FPGA. The externally stored valid CRC checksum value can be stored in a non-programmable circuit, i.e. a fixed circuit that cannot be reprogrammed. Comparing the generated CRC checksum value can in one embodiment be performed in an external separate non-programmable circuit.

The method ensures that, until the generated CRC checksum value has been computed, the CRC checksum value is driven to a value different than the valid CRC checksum value. In one embodiment of the invention, this is done by driving the generated CRC checksum value with pull-down and/or pull-up resistors to a value that is different than the externally stored valid CRC checksum value. This covers the time from power-up and until the FPGA starts driving the generated CRC checksum value.

In one embodiment of the invention, the generated CRC checksum value is reset to a value that is different from the externally stored valid CRC checksum value, and not updated until the generated CRC checksum value has been computed. In another embodiment of the invention, the generated CRC checksum value output from the FPGA is tri-stated until the generated CRC checksum value has been computed.

Figure 7:
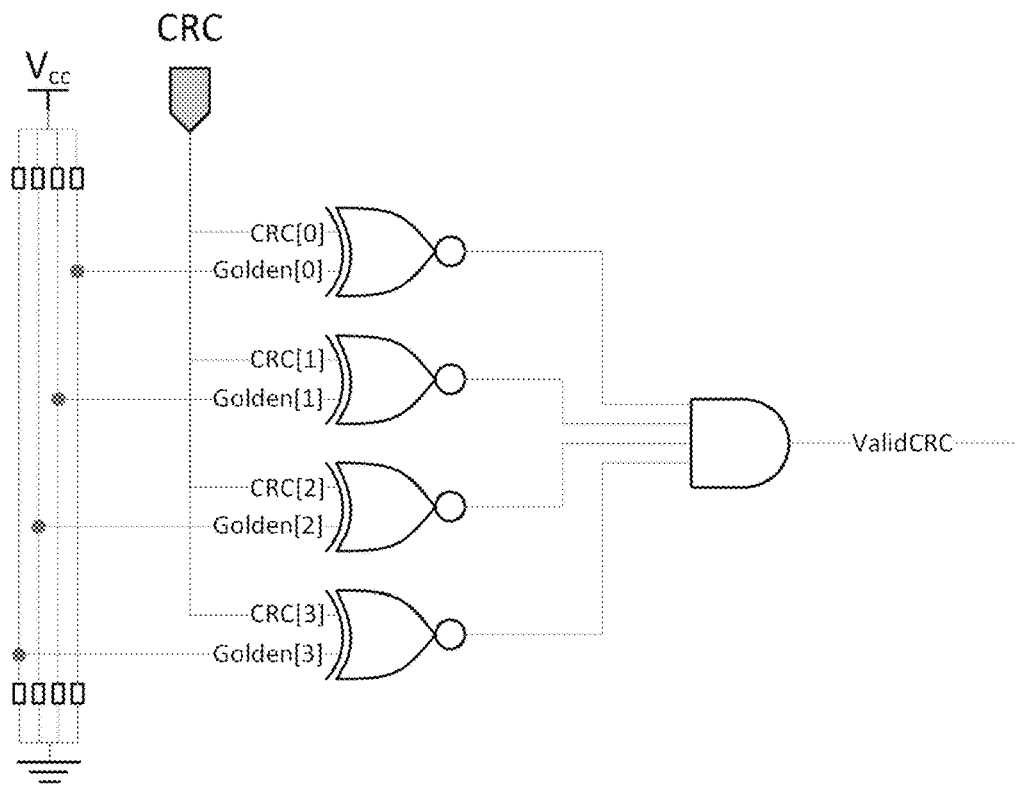
FIG. 7 shows an example of a 4-bit CRC checksum logic.

FIG. 7 shows an example of a 4-bit CRC checksum logic. Any number of bits for the CRC checksum can be applied. External, discrete logic provides a Compare function which compares the computed CRC checksum with the expected CRC checksum, called Golden[0] - Golden[3] in the figure. It is essential that both the Golden values and the equality check logic are not part of the FPGA to ensure that the check cannot be circumvented by a change in the FPGA configuration.

The values for Golden[] should be stored on a Printed Circuit Assembly (PCA). There are many possible storage media that can be used to store this data. One possible example of this storage medium is to use a network of pull-up and pull-down resistors to encode the expected CRC checksum. The product structure must be changed to populate the correct pull-up and pull-down resistors in the network. Another example is to use DIP switches. Storing the expected CRC (Golden[ ]) in the PCA ensures that the FPGA configuration cannot be changed unless the PCA changes.

The logic that implements the comparison between CRC[ ] and Golden[ ] cannot be implemented in the FPGA being checked. It should also not be implemented in any other volatile FPGAs in the design. This will prevent that a change in two FPGA configurations override the check provided by the configuration authentication. The compare block will then provide an Interlock control signal ValidCRC at the output. The signal may be set to high "1" if they match and to low "0" if they do not match.

The final step of the method according to the invention is performed by the interlock circuitry which ensures that the control signals are kept in their safe state as long as the ValidCRC signal is set to low "0". When the ValidCRC signal is set to high "1", the control signals are controlled by the FPGA. In this way outputs of selected logic functions of the configuration of the FPGA are enabled only if the compared generated CRC checksum values and the stored valid CRC checksum values are identical.

By performing the different steps of the method described above, one or more logic functions will only operate if the loaded FPGA configuration has been authenticated.

Figure 8:
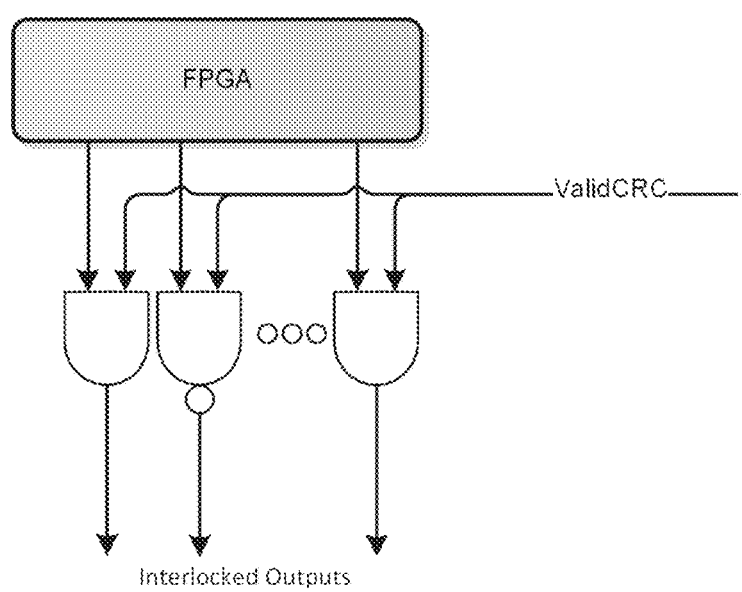
FIG. 8 shows an example of interlock circuitry.

FIG. 8 shows an example of interlock circuitry where the interlock is implemented using AND and NAND gates and the Interlock control signal ValidCRC.

The checking mechanism cannot depend on the FPGA to perform this interlock function. Instead it must be performed in logic external to the FPGA. As shown in FIG. 8, discrete gates are preferred for maximum safety. If the control signal ValidCRC is set to high "1", the functionality of the FPGA is enabled for controlling a specific device.

The method and system enabling the method described above ensures that a ValidCRC interlock control signal is set to disable after power-up, before the FPGA is configured and before the CRC checksum has been computed, and if the CRC checksum does not match the expected CRC checksum. This ensures that regardless of the state of the output signals from the FPGA, it cannot control logic functions before the actual FPGA configuration has been checked and the ValidCRC signal is asserted.

The present invention provides a secure way of using programmable logic in a Field Programmable Gate Array, FPGA, with a volatile configuration-memory, for controlling a safety significant device by means of safety significant functions implemented in the FPGA providing control signals on the outputs of the FPGA when the configuration is confirmed valid.

The invention claimed is:

1. A method for authenticating and enabling a configuration implemented as logic functions in programmable logic in a Field Programmable Gate Array, FPGA, with a volatile configuration-memory, where authentication enables activation of selected logic functions of the configuration, the method comprises:

loading, from a memory module connected to the FPGA, the configuration into the volatile configuration-memory of the FPGA via an external input interface of the FPGA, reading content of the volatile configuration-memory of the FPGA via an interface of the FPGA immediately after completed loading of the configuration, computing one or more different Cyclic Redundancy Check (CRC) checksums of the read content of the configuration-memory in one or more CRC generators, comparing computed CRC checksum values in a comparator module distinct from the FPGA and connected to an output of the FPGA with externally stored valid CRC checksum values, stored in a non-programmable circuit separate from the FPGA, of an expected FPGA configuration, enabling outputs from the FPGA of the selected logic functions of the configuration, via a connected interlock device, separate from the FPGA, comprising logic gates connected to the outputs of the FPGA and an output of the comparator module, and wherein the outputs from the FPGA are enabled only if the computed CRC checksum values and the externally stored valid CRC checksum values are identical, wherein the outputs of the selected logic functions are driven to a safe value by the connected interlock device before the CRC checksum values are computed.

2. The method according to claim 1, disabling the logic functionality of the FPGA at latest immediately after completed loading of the configuration into the memory of the FPGA.

3. The method according to claim 2, where disabling of the logic functionality of the FPGA is performed by setting CRC checksum values that are initially output from the CRC generators to other values than the stored valid CRC checksum values.

4. The method according to claim 2, where disabling selected logic functions of the FPGA is performed by stopping internal clocks for this logic functionality in the FPGA.

5. The method according to claim 2, by computing the one or more CRC checksums in one or more internal CRC generators of the FPGA and outputting resulting generated CRC checksum values, via external outputs of the FPGA, to external discrete logic comparing the generated CRC checksum values with the externally stored valid CRC checksum values generated from the expected and valid configuration.

6. The method according to claim 2, by computing the one or more CRC checksums in one or more CRC generators that are external to the FPGA after outputting readout from the configuration memory to the one or more external CRC generators, via external outputs of the FPGA, and comparing resulting generated CRC checksum values in external discrete logic with the externally stored valid CRC checksum values generated from the expected and valid configuration.

7. The method according to claim 2, by including a configuration for computing one or more different Cyclic Redundancy Checksums in the one or more CRC generators of the FPGA as a part of the configuration loaded into the configuration-memory of the FPGA.

8. The method according to claim 2, by comparing the generated CRC checksum values in external non-programmable circuits.

9. The method according to claim 2, where the logic functions in programmable logic in the Field Programmable Gate Array, FPGA, are safety significant functions.

10. A system for authenticating and enabling activation of a configuration implemented as logic functions in a Field Programmable Gate Array, FPGA, with a volatile configuration-memory, where authentication enables activation of selected logic functions of the configuration for controlling a device, the system comprises:

a memory module connected to an input of the FPGA, the memory module comprises the configuration to be used by the FPGA, a comparator module distinct from the FPGA and connected to an output of the FPGA for comparing a valid Cyclic Redundancy Check value (CRC) checksum value stored in a non-programmable circuit separate from the FPGA, with a received CRC checksum value generated by a CRC checksum generator from a content of the configuration-memory of the FPGA that is read immediately after completed loading the configuration into the memory of the FPGA;

an interlock device, separate from the FPGA, connected to outputs of the FPGA carrying selected logic signals for controlling a function and which has an input connected to the comparator module, the interlock device comprises logic gates and is adapted for enabling or disabling the logic signals on the outputs of the FPGA based on an enable/disable signal from the comparator module, wherein the outputs of the selected logic functions are driven to a safe value by the connected interlock device before the CRC checksum values are computed.

11. The system according to claim 10, where the valid CRC checksum is encoded in pull-up and pull-down resistor values stored on separate discrete logic.

12. The system according to claim 10, where the valid CRC checksum is encoded in Dual in-line Packages, DIP, switches.

13. The system according to claim 10, where the comparator module comprises logic for comparing generated CRC checksum with a valid CRC checksum.

14. The system according to claim 10, where the interlock device comprises logic gates and outputs configured to pass signals from the outputs of the FPGA only when receiving a valid CRC checksum on the input connected to the comparator.

* * * * *